Aug. 6, 1957
C. E. ASHBY
2,802,030
PURIFICATION OF HEXAMETHYLENEDIAMINE
Filed March 26, 1954
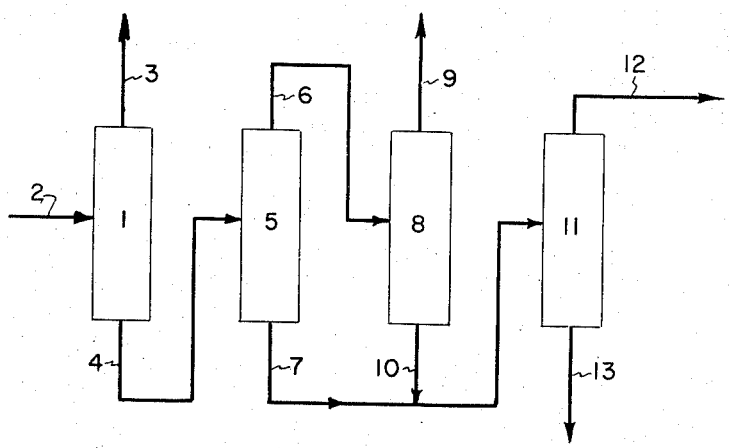
INVENTOR
CLARENCE E. ASHBY
BY
ATTORNEY

2,802,030
PURIFICATION OF HEXAMETHYLENEDIAMINE

Clarence E. Ashby, Wilmington, Del., assignor to E. I. du Pont de Nemours and Company, Wilmington, Del., a corporation of Delaware Application March 26, 1954, Serial No. 418,924

1 Claim. (Cl. 260—583)

This invention relates to an improved hexamethylenediamine composition, to improved salts thereof with dibasic carboxylic acids such as adipic acid, to improved polymers obtained from said salts, and a new and improved process for the production of such products.

This is a continuation-in-part application of my copending application Serial No. 220,481, filed April 11, 1951, now abandoned.

Hexamethylenediamine is now a well-known compound. On a commercial scale, it may be prepared most conveniently by catalytically hydrogenating adiponitrile in the presence of ammonia. The principal use of hexamethylenediamine involves condensing it with dibasic acids to produce polyamides. In manufacturing these polyamides, important advantages are obtained by reacting the diamine in a first step with an equivalent amount of dibasic carboxylic acid to form a salt, using a solvent such as methanol or ethanol in accordance with the teachings of U. S. Patent No. 2,130,947. This salt is subsequently converted in a second step to the polyamide condensation product.

For many years, there has existed a serious problem of producing polyamide products of consistently high quality, i. e., products of uniformly good color and uniformly high strength. The procedure which has given the best results in the past involves preparation of the diamine-dibasic acid salt in alcohol, coupled with relatively prompt polymerization of this salt to the polyamide. Occasionally, however, and without any apparent explanation, polymer of poor quality was obtained, even when using this preferred procedure, and deviations from this preferred procedure almost invariably resulted in the formation of even poorer quality polymer.

It is an object of this invention to provide improved hexamethylenediamine compositions and to provide processes for preparing such compositions. It is a further object of the invention to provide improved salt compositions derived from hexamethylenediamine and dibasic carboxylic acids, and to provide process for preparing such compositions. It is a particular object of this invention to provide a superior hexamethylenediammonium adipate salt. A still further object of this invention is to provide improved polyamide compositions and processes for preparing same. Another object of the invention is to provide a process for preparing the compound, 1,2-diaminocyclohexane. Other objects of this invention will appear hereinafter.

In accordance with this invention, it has been discovered for the first time that the catalytic hydrogenation of adiponitrile under commercially attractive conditions generally results in the formation of very small amounts of the compound, 1,2-diaminocyclohexane, along with the desired product, hexamethylenediamine, and that the presence of this cyclic compound, even in very minute quantities, has an unexpectedly drastic and critically adverse effect on the quality and color stability of the hexamethylenediamine regarding its use as an ingredient for the formation of salts with dibasic carboxylic acids. The 1,2-diaminocyclohexane gives rise to salt solutions which have poor and variable color, and the polyamides derived from these salt solutions not only have poor color but also are characterized by irregular tensile strength and non-uniform dyeing properties. The fact that this cyclic compound is formed in the first place was entirely unknown heretofore and was entirely unexpected. Secondly, the fact that such small amounts of this compound can cause such critical effects is likewise entirely unexpected and difficult to explain. Thirdly, even after the cause of the trouble is ascertained and fully explained, the satisfactory removal of the small amounts of 1,2-diaminocyclohexane from the hexamethylenediamine on a commercial scale presents a difficult problem.

It is a matter of history that satisfactory polyamides can be prepared on a commercial scale from hexamethylenediamine, but in order to do so, it has been necessary heretofore to follow very closely a particular procedure for preparing the hexamethylenediamine-dibasic acid salt. This procedure involves the use of an alcohol solvent within which the salt is formed. As a result, the salt must be subjected to a filtration treatment and then be redissolved in water; the alcohol solvent must be recovered in order for the operation to be economical; and the losses of salt in the alcohol mother liquor are appreciable. If an attempt was made in the past to prepare the salt under other conditions, as, for instance, by reacting the hexamethylenediamine and the dibasic acid directly in water, the salt was of poor color stability, and the polyamides obtainable therefrom not only had poor color but also exhibited poor and irregular strength. By way of contrast, it has now been found that effective removal of 1,2-diaminocyclohexane from hexamethylenediamine results in consistently good color stability of the salt formed therefrom and consistently high quality polymer, regardless of whether or not the salt is formed in the presence of the alcohol solvent.

Accordingly, there are provided hexamethylenediamine compositions resulting from the catalytic hydrogenation of adiponitrile and containing less than 250 p. p. m. of 1,2-diaminocyclohexane. There are also provided salt compositions of hexamethylenediamine with equivalent amounts of one or more dibasic acids, such salt compositions having been formed in aqueous media and containing less than 250 p. p. m. of 1,2-diaminocyclohexane. In addition there are provided polyamide condensation products derived from said salt compositions.

In accordance with one embodiment of the invention, the 1,2-diaminocyclohexane is separated from the crude hexamethylenediamine by fractionally distilling it by a distillation process capable of separating constituents having a relative volatility of 2 or less without removing to exceed 10% of the less volatile constituent.

A further embodiment of the invention involves using an aqueous solution in which to carry out the salt formation step wherein a hexamethylenediamine composition containing less than 250 p. p. m. of 1,2-diaminocyclohexane is reacted with an equivalent amount of one or more dibasic acids.

In accordance with a particularly preferred embodiment of the invention, crude hexamethylenediamine resulting from the catalytic hydrogenation of adiponitrile is subjected to distillation in a series of columns such as is described hereinafter until the hexamethylenediamine composition contains less than 250 p. p. m. of 1,2-diaminocyclohexane, the hexamethylenediamine thus obtained is reacted with an equivalent amount of adipic acid in a water solution, and the resulting hexamethylenediammonium adipate is converted into a synthetic linear condensation polyamide, capable of being formed into uniformly strong, colorless fibers.

It was very surprising that 1,2-diaminocyclohexane should be formed, even in small amounts, in the catalytic hydrogenation of adiponitrile. Hexamethylenediamine, of course, is the principal product of this reaction and can be obtained in yields which, for most purposes, would be considered practically quantitative. The main by-product is the half-hydrogenation product, epsilon-amino-capronitrile, which can be converted, upon further hydrogenation, to the desired end product, hexamethylenediamine. In addition, cyclization has been found to occur to a slight degree under these hydrogenation conditions to form the seven-membered heterocyclic ring, hexamethyleneimine, $CH_2CH_2CH_2CH_2CH_2CH_2NH$. Also, the triamine $NH_2(CH_2)_6NH(CH_2)_6NH$, is formed in appreciable amounts, and some pentamethylenediamine is present. No reason, however, has ever existed, either on the basis of this process or on the basis of analagous organic reactions, to suspect the formation of a new bond between the carbon atoms of the two nitrile groups, leading to the formation of a six-carbon ring. The theory that the reaction involves the two nitrile groups is supported by data showing that hydrogenation of the half-hydrogenation product, epsilon-amino-caproniltrile, produces only 5% as much 1,2-diaminocyclohexane as the direct hydrogenation of adiponitrile produces.

Evidence collected so far indicates that the 1,2-diaminocyclohexane produced in this hydrogenation of adipontrile exists almost exclusively in the form of the cis isomer. This likewise was surprising, since a process of this nature might be expected to produce a mixture containing both the cis and the trans isomers.

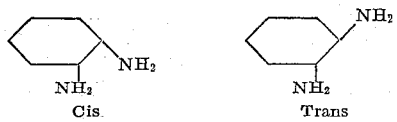

Cis    Trans

The cis isomer, not heretofore fully characterized, melts as 6° C., boils at 103° C./40 mm., and has a refractive index, $n_D^{25°C.}=1.4882$. The trans isomer has a melting point of 14.8° C., and a boiling point of 80°–82° C./12 mm. Neither fractionation, X-ray diffraction techniques nor refractive index techniques have shown the presence of any of the trans isomer of 1,2-diaminocyclohexane in these hexamethylenediamine compositions. The cis isomer is normally present in the crude hydrogenation mixture in amounts varying from about 600 to 2000 parts per million.

The most surprising thing of all is that these small amounts of 1,2-diaminocyclohexane should exert such a critical influence on the color stability of the diamine-dibasic acid salt compositions and on the color and strength of the polyamides produced therefrom. The tendency of the salt, and of the resulting polymer, to exhibit undesirable color varies almost directly with the amount of 1,2-diaminocyclohexane present in the hexamethylenediamine. In addition, there is convincing evidence that the presence of any appreciable amount of 1,2-diaminocyclohexane results in the formation of filaments which are weak at certain points. These weak or irregular fibers break easily and cause considerable disruption in subsequent textile processing steps.

The difficulty inherent in finding a solution to this problem of poor quality salt compositions is apparent in view of the following factors and possibilities. In the first place, the trouble might stem from either the dibasic acid, the hexamethylenediamine, the solvent, or the reaction conditions. Secondly, the 1,2-diaminocyclohexane isomer, which has now been found to be the cause of the trouble, is present in such small amounts in the hexamethylenediamine as to be difficultly detectable. Thirdly, the physical characteristics of the compound were not known. Fourthly, the compound is not at all easily separable from the hexamethylenediamine. And finally, the harm resulting from its presence could be minimized by certain expedients, which, though cumbersome, roundabout, and not invariably effective, had the effect of masking the real cause of the trouble.

Hydrogenation of adipontrile to hexamethylenediamine may be effected using various hydrogenating catalysts such as nickel, cobalt, copper, zinc, platinum, palladium, ruthenium, and the like. These elements, either in the form of the free metals, or in the form of compounds such as the oxides or salts, may be employed, if desired, in conjunction with known promoters and/or supports. Operation may be in either the liquid or the vapor phase, and the catalyst may advantageously be employed in a fluidized form. Cobalt catalysts, and in particular catalysts comprising reduced cobalt oxide, are preferred.

The adiponitrile which is employed may be derived from any suitable source, such as the reaction of adipic acid with ammonia, the reaction of dichlorobutane with HCN, the hydrogenation of dicyanobutene, etc. If desired, etc. If desired, the adiponitrile can be premixed with hydrogen in a high pressure gas-liquid mixer, prior to being introduced into the catalyst chamber.

The amount of 1,2-diaminocyclohexane formed during the hydrogenation of adiponitrile may vary to some extent, depending upon the particular catalyst employed, the activity of the catalyst, the amount of hydrogen employed, the temperature and pressure conditions, and the like. Variations in the amount of added ammonia employed during the hydrogenation apparently do not affect the amount of 1,2-diaminocyclohexane formed within the range of from 3 to 5 mols of ammonia per mol of adiponitrile, but if the amount of added ammonia is cut down to about 2 mols of ammonia per mol of adiponitrile, then the rate of formation of 1,2-diaminocyclohexane is increased. Continuous operation tends to reduce the amount of 1,2-diaminocyclohexane formed, as compared to batch operation. In the commercially attractive hydrogenation processes devised to date, however, there is always enough 1,2-diaminocyclohexane formed to give rise to subsequent difficulties when using the hexamethylenediamine to prepare polyamides. Hence, some form of separation is necessary if it is desired to take advantage of the most convenient methods for preparing and polymerizing the salt.

The identification of 1,2-diaminocyclohexane involves the formation of a Schiff's base with salicylaldehyde, using an alcohol solvent, followed by reaction with cobalt in the form of cobaltous acetate tetrahydrate to form a chelate complex known as a "Salcomine." In the case of the cis isomer, a red precipitate is formed, whereas, in the case of the trans isomer, a yellow color is formed. The formation of this type of complex compound is discussed by Bailes and Calvin, J. A. C. S. 69, 1886 (1947).

The amount of 1,2-diaminocyclohexane present in crude hexamethylenediamine obtained by hydrogenation of adiponitrile varies from about 600 to 2000 p. p. m. If this crude diamine is reacted with adipic acid according to the so-called "methanol strike" technique, i. e., if the salt is formed by reacting equivalent amounts of diamine and acid in the presence of a methanol solvent, then over 90% of the 1,2-diaminocyclohexane is carried off in the methanol mother liquor and high quality salt can be obtained, particularly if the polymerization is carried out promptly. For example, when hexamethylenediamine containing about 1000 p. p. m. of 1,2-diaminocyclohexane is formed into salt by the methanol strike technique, the resulting salt generally contains only about 30 to 50 p. p. m. of 1,2-diaminocyclohexane. If, on the other hand, this crude diamine were to be reacted with adipic acid in accordance with the so-called "water strike" technique, i. e., if the salt is formed by reacting the diamine and acid directly in the presence of water, all of the 1,2-diaminocyclohexane orginally present in the hexamethylenediamine is retained in the salt, and salt of very poor and variable color stability is obtained. It has now been ascertained that these difficulties encountered when the water strike technique is employed are due almost exclusively to the presence of too much 1,2-diaminocyclohexane in the hexamethylenediamine.

One of the greatest difficulties resulting from the presence of 1,2-diaminocyclohexane in the salt compositions is that it causes such variation and unpredictability in the colors of the salt and the resulting polymer. Even through some color were present, if it were uniform and reproducible, one might be able to compensate for it in subsequent dyeing treatments, etc. But when 1,2-diaminocyclohexane is present, the color forms progressively with the passage of time or, in other words, increased hold up time increases the color. The amount of color formation is very closely dependent upon the concentration of 1,2-diaminocyclohexane present and increases, roughly speaking, as the exponential function of time. After a certain amount of color has formed, it can be removed from the salt solution, for instance, by treatment with activated carbon, but color formation still continues after the activated carbon treatment has been completed, either in the salt solution itself or in the polymer formed from the salt. The result is that once the 1,2-diaminocyclohexane gets into the salt it causes continuous difficulty thereafter.

The following table shows the rates at which salt solutions containing varying amounts of 1,2-diaminocyclohexane develop color during storage in the presence of air at 35° C. The color formation is progressive and is reported in terms of A. P. H. A. units per hour. The salt is formed by reacting essentially pure adipic acid in water with hexamethylenediamine which contains varying amounts of 1,2-diaminocyclohexane. A rate of color formation, in A. P. H. A. units, of over 0.20 is very objectionable.

*Table I*

| Amount of 1,2-diaminocyclohexane present in the hexamethylenediamine used to prepare the salt | Rate of color formation, A. P. H. A. units per hour |
|---|---|
| 0 | Color development, negligible. |
| 200 p. p. m | 0.16. |
| 400 p. p. m | 0.41. |

The rate of color formation is also affected by the nature of the surrounding atmosphere and the prevailing temperature conditions. The presence of air definitely increases the amount of color formed, as compared to the amount of color formed in an inert atmosphere, and more color tends to form when the salt solutions or polymers are stored at high temperatures. The color formation results from oxygen coming into contact with the 1,2-diaminocyclohexane which would explain the fact that commercial hexamethylenediamine as manufactured heretofore darkens on standing in contact with air.

Under ordinary conditions, the amount of color formed in salt solutions containing 1,2-diaminocyclohexane is not very great, either at the end of 24 hours, or even 48 hours, but it is still enough to cause discrepancies in color between different batches of polymer. After more than about 72 hours has elapsed, however, the color in the resulting polymer becomes great enough to be bad, per se, even without comparing the polymer to other batches of polymer. If the amount of 1,2-diaminocyclohexane in the hexamethylenediamine gets up to 2000 p. p. m., extremely poor quality polymer and yarn are obtained. Under such circumstances, the yarns have very poor and irregular tensile strength and the frequent breaks in the yarn cause serious and wasteful interruptions in the spinning and twisting operations. In contrast thereto, efficient removal of the 1,2-diaminocyclohexane from the hexamethylenediamine makes possible the production of polymer and yarn having consistently good color and consistently good strength properties.

The 1,2-diaminocyclohexane may be satisfactorily separated from crude hexamethylenediamine by carefully controlled distillation, carried out either batchwise or continuously, employing a fractionation process capable of separating constituents having a relative volatility of 2 or less without removing to exceed 10% of the less volatile constituent. By such fractionation process the 1,2-diaminocyclohexane may be removed from a content of 1200 p. p. m. to a content of less than 250 p. p. m.

Prior to this invention, it was known that certain impurities were present in crude hexamethylenediamine and that it was necessary to remove them by fractional distillation. Heretofore, the only known impurities were hexamethyleneimine, epsilon-amino-capronitrile, and certain soluble high molecular weight, high-boiling polymeric amines, the lowest member of which is bis-(hexamethylene)triamine. These materials were easily separated by a simple fractionation by a distillation process which removed the hexamethyleneimine as a first cut overhead, then fractionated the product hexamethylenediamine and left the epsilon-amino-capronitrile and high-boiling polymeric amines as a residue. The commercial process utilized consisted of a batch still having a 25-foot packed column, 48 inches in diameter. The distillation was operated at a pressure of 2 inches mercury absolute with a reflux ratio during topping of 2:1 until a head temperature of 100° C. was reached and a reflux ratio of 2:1 to 4:1 until a head temperature of 125° C. was reached. The hexamethylenediamine in the cut between 100° C. and 125° C. comprised about 98% of the crude product and contained 12 to 14 p. p. m. hexamethyleneimine, 32 to 40 p. p. m. epsilon-amino-capronitrile and substantially none of the high-boiling polymeric amines. The presence of such minute amounts of these impurities is completely unobjectionable. It was not known heretofore, however, that the so-purified hexamethylenediamine product also contained 1,2-diaminocyclohexane. In fact, it contained such an amount, 300 to 800 p. p. m., of this material as to cause very objectionable color formation.

This formerly used commercial process is entirely unsatisfactory to remove 1,2-diaminocyclohexane from the crude hexamethylenediamine. If by such process the content of 1,2-diaminocyclohexane is reduced to the extent necessary to prevent color formation, 30% to 35% of the hexamethylenediamine would also be lost as is illustrated by the following process which simulates the commercial process above described.

Crude hexamethylenediamine containing 2730 p. p. m. of 1,2-diaminocyclohexane, 10,100 p. p. m. hexamethyleneimine, 13,200 p. p. m. of aminocapronitrile, and 310 p. p. m. of ammonia was batch fractionated in a 36 inch by ⅞ inch i. d. glass laboratory column packed with ⅛ inch Fenske rings under 38 mm. of mercury pressure at 5:1 reflux ratio. The residue after successive cuts obtained the following concentrations of hexamethyleneimine and of 1,2-diaminocyclohexane.

| Cut | Percent of Charge Distilled | Concentration in Residue (p. p. m.) | |
|---|---|---|---|
| | | Hexamethyleneimine | 1,2-Diaminocyclohexane |
| 0 | 0 | 10,100 | 2,730 |
| 1 | 4.6 | 78 | 2,640 |
| 2 | 9.9 | 12 | 988 |
| 3 | 15.0 | 8 | 603 |
| 4 | 19.9 | 6 | 436 |
| 5 | 25.2 | 4 | 305 |
| 6 | 30.2 | 3 | 240 |
| 7 | 40.5 | 1 | 105 |
| 8 | 50.2 | 0 | 57 |

No cut in the above distillation contained more than 25 p. p. m. epsilon-amino-capronitrile and substantially no high boilers.

The relative volatility of 1,2-diaminocyclohexane to hexamethylene diamine is about 1.62, whereas the relative volatility of hexamethyleneimine to hexamethylenediamine is about 6.5 to 10.5, depending upon the temperature. The relative volatility of hexamethylenediamine to bis(hexamethylene)triamine is over 80. The term "relative volatility" means the ratio of the volatility of component 1 as compared to the volatility of component 2, and, in the case of components which follow Raoult's law, the relative volatility equals the vapor pressure of component 1, divided by the vapor pressure of component 2.

The above-described distillation processes heretofore used for the removal of impurities from hexamethylenediamine are incapable of separating constituents having a relative volatility of 2 or less without also losing 30% or more of the hexamethylenediamine. A distillation process, for economic operation, is designed to separate the constituents present in accordance with the relative volatility of such constituents.

It has been found, in accordance with this invention, that to separate such an amount of 1,2-diaminocyclohexane as to reduce the content thereof to less than 250 p. p. m. without undue loss of hexamethylenediamine that the distillation process employed must be one capable of separating constituents having a relative volatility of 2 or less without removing to exceed 10% of the less volatile constituent.

A particularly useful distillation system for carrying out this separation is shown in the accompanying Figure 1. The crude hexamethylenediamine, containing from 600 to 2000 p. p. m. of 1,2-diaminocyclohexane together with added water, is introduced into column 1 via inlet line 2. Column 1, which is generally a packed column, is operated at about atmospheric pressure and serves primarily to remove most of the water overhead via pipe 3, together with hexamethyleneimine which forms a low-boiling azeotrope with water. The tails from this column, containing a small amount of water, are carried via pipe 4 to column 5 which is operated under vacuum, usually at an absolute pressure of about 50 to 400 mm. The bulk of the 1,2-diaminocyclohexane is taken overhead via line 6, together with any pentamethylenediamine that may be present, some water, and about 15% of the hexamethylenediamine. The tails from column 5, which contain most of the hexamethylenediamine freed from 1,2-diaminocyclohexane, are passed via line 7 to column 11. The heads from column 5 are passed via line 6 into the heads concentrator column 8, wherein the 1,2-diaminocyclohexane is taken out of the system overhead and most of the hexamethylenediamine is recovered in the tails. This recovered hexamethylenediamine can be recycled from the heads concentrator column 8 to column 1 via inlet line 2, or to column 5 via line 4. In many instances, however, it is sufficiently pure to be added directly via lines 10 and 7 to the final refining column 11. When the volume of stream 6 is about 20% of the stream 2, it is advantageous to recycle the tails from column 8 to column 5, whereas, when the volume of stream 6 is about 15% of stream 2, it is better to operate in the manner shown in the figure.

The refining column 11 operates on the tails from column 5, plus, if desired, the tails from the heads concentrator column 8. In column 11, refined diamine is separated from high boilers, the refined diamine, containing less than 500 p. p. m. of 1,2-diaminocyclohexane, being taken overhead via line 12 and the high boilers being removed from the system via line 13. This latter stream includes the half-hydrogenation product, epsilon-amino-capronitrile, which boils about 25° C. above hexamethylenediamine and which can also cause considerable difficulty in subsequent operations, if not removed. This epsilon-amino-capronitrile can be recycled to the hydrogenation step in order to increase the over-all yield to hexamethylenediamine.

The fraction taken overhead via line 9 contains about 4% of 1,2-diaminocyclohexane, which constitutes most of the 1,2-diaminocyclohexane originally introduced into the system. The 1,2-diaminocyclohexane can be recovered as the substantially pure compound by further distillation of this overhead stream.

If desired, the system shown in Figure 1 can be modified by elimination of column 8, the heads concentrator, in which case the effluent from line 6 would be removed from the system. Furthermore, the entire system can be incorporated into a single column, with feeds and outlets located at the proper levels.

The following conditions have been found to be most satisfactory for the operation of a system such as that shown in Figure 1.

|  | Col. 1 | Col. 5 | Col. 8 | Col. 11 |
|---|---|---|---|---|
| No. of actual plates | (Packed column). | 40 | 40 | 40. |
| Head temperature (° C.) | 100 | 146 | 120 | 112. |
| Base temperature (° C.) | 195 | 170 | 167 | 148. |
| Pressure | atmospheric | 150 mm. | 150 mm. | 37 mm. |
| Reflux ratio | 1:1 | 7.5:1 | 20:1 | 1:1. |

When operating under these conditions, hexamethylenediamine is obtained containing about 200 p. p. m. of 1,2-diaminocyclohexane, and about 0.8% of the feed is purged from the system via line 9.

By increasing the reflux ratio in column 8 from 20:1 to 35:1, the 1,2-diaminocyclohexane content of the hexamethylenediamine is reduced from about 200 p. p. m. to about 100 p. p. m. Extremely good results are also obtained when operating the last three columns at double the pressures shown in the above table, i. e., 300 mm. pressure in columns 5 and 8 and about 75 mm. pressure in column 11. When operating at these higher pressures, the base and head temperatures are also proportionately higher, of course.

No satisfactory theory has been advanced to explain the highly chromophoric nature of the 1,2-diaminocyclohexane or its derivatives. Oxidation is an important factor, however, and the simultaneous presence of the 1,2-diaminocyclohexane with air or oxygen seems to cause the trouble. The relative concentration of 1,2-diaminocyclohexane to hexamethylenediamine is also an important factor. Particularly acute difficulties arise when polymers which contain too much 1,2-diaminocyclohexane are dyed with acid dyes.

Regardless of theory, however, the fact remains that hexamethylenediamine which has been highly purified to remove 1,2-diaminocyclohexane develops no visible color on standing in air for several months. Hexamethylenediamine containing less than 250 p. p. m. of 1,2-diaminocyclohexane is well adapted for use in preparing superior polyamides, either by direct polymerization with a dibasic carboxylic acid, such as adipic acid, or by formation of a salt with the dibasic acid, followed by polymerization in a second step.

The greatest advantage of the present invention is that it makes possible the use of the water strike technique in preparing salts, which is far simpler and more economical than the alcohol strike technique. Salt formation itself, prior to polymerization, is a marvelous way of arriving at exactly equivalent amounts of diamine and dibasic acid, since the pH measurement gives a far more accurate indication of equivalency than any weighing step possibly could. By removing the 1,2-diaminocyclohexane, it is possible for the first time to prepare satisfactory salt by the water strike technique. The elimination of the methanol strike eliminates the step of crystallizing the salt, the step of filtering it to separate it from the methanol, the step of redissolving the salt in water prior to shipment, the step of recovering the methanol, the equipment needed for all these steps, the losses of salt in the methanol itself in the recovery operation, and the losses of salt during handling. It also frequently eliminates or minimizes the step of treating the salt solutions with activated carbon, or the like, to remove impurities and color, since these have already been removed from the hexamethylenediamine itself.

Since many modifications of this invention will occur to those skilled in the art, it is not intended that the scope of the invention should be limited except by the claims appended hereto.

The embodiments of the invention in which an exclusive property or privilege is claimed are defined as follows:

A process for the purification of crude hexamethylenediamine containing over 250 p. p. m. of 1,2-diaminocyclohexane which comprises distilling 1,2-diaminocyclohexane from the crude hexamethylenediamine, without removing to exceed 10% of hexamethylenediamine, until said 1,2-diaminocyclohexane content has been reduced to less than 250 p. p. m. in a distillation system capable of separating constituents having a relative volatility of not to exceed 2.0 without removing to exceed 10% of the less volatile constituent.

References Cited in the file of this patent

UNITED STATES PATENTS

| | | |
|---|---|---|
| 2,166,151 | Howk | July 18, 1939 |
| 2,166,152 | Howk | July 18, 1939 |
| 2,504,024 | Howk et al. | Apr. 11, 1950 |

FOREIGN PATENTS

| | | |
|---|---|---|
| 490,922 | Great Britain | Aug. 16, 1938 |